UNITED STATES PATENT OFFICE.

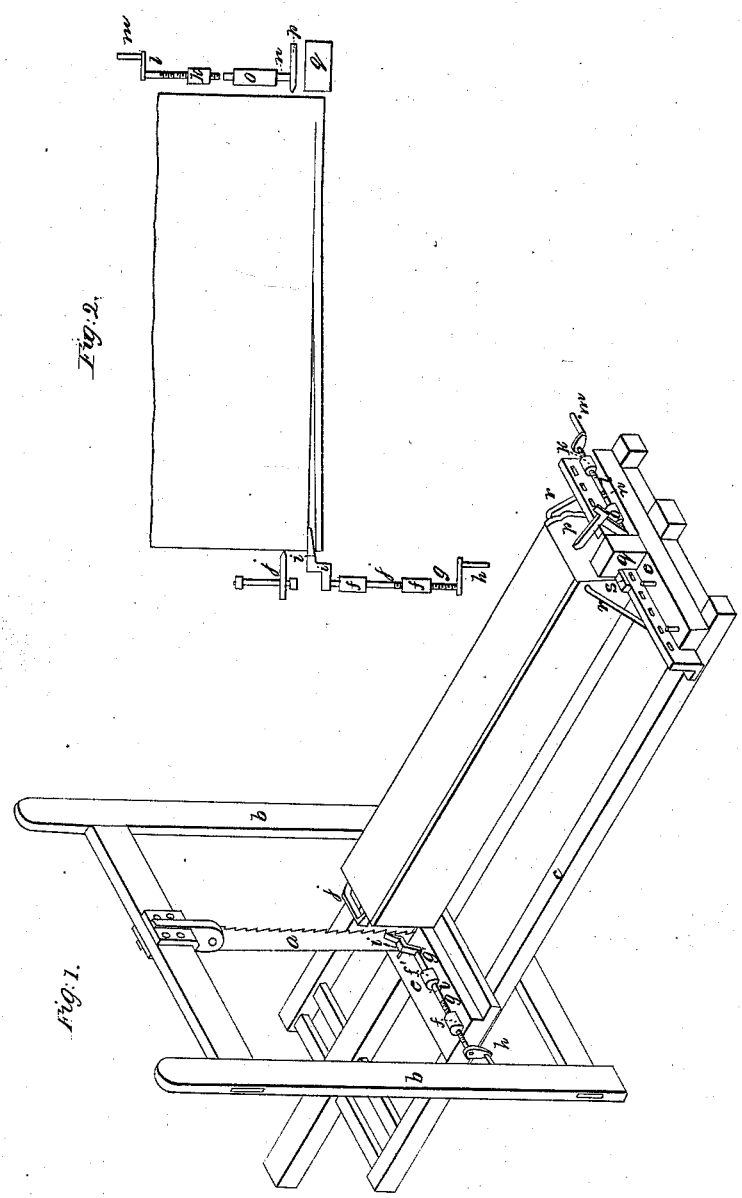

JOHN W. ROBBINS, OF CAMDEN, OHIO.

SETTING LOGS IN SAWMILLS.

Specification of Letters Patent No. 8,042, dated April 15, 1851.

*To all whom it may concern:*

Be it known that I, JOHN W. ROBBINS, of Camden, Preble county, Ohio, have invented new and useful Improvements in Sawmill-Dogs; and I do hereby declare the following to be a full, clear, and exact description of the same, reference being had to the annexed drawings, making part of this specification, Figure 1 being a perspective view and Fig. 2 a bird's-eye view of a saw frame, &c., with my dogs attached.

The object of my invention is to provide a simple and easily arranged apparatus by which the log may be shifted a certain exact distance at each end between each consecutive cut.

The saw ($a$), saw-gate ($b$), mill frame ($c$), carriages ($e$, $t$,), not differing from those ordinarily employed need no particular description here.

The front end of the log is adjusted by the following mechanism. Upon the forward carriage ($e$) is a projection ($f$) which affords a socket for a set screw ($g$) which is rotated by a crank ($h$); in a line with the set screw is a bolt ($g'$) which traverses in a socket ($f'$) by the impingement of the set screw upon it. At the other end of the bolt ($g'$) is a head or dog ($i$), which affords when thrown down and against the face of the log, the ready means of adjusting the width of cut which is first of all determined by the set screw. The log is then held in position by the dog ($j$); after the cut, the head ($i$) is raised, forced out somewhat, and the tongue of the head brought down within the kerf just made. The log is then moved for another cut by bringing its new face in contact with the tongue of the head ($i$), when it will have traversed laterally precisely the width of the sawn board and the kerf just made; being then dogged again by ($j$) it is so far as regards this end of the log, ready for another cut.

The rear adjustment is as follows: the variation being necessary from the absence of a kerf for the insertion of the tongue of the dog. Upon the transom ($e'$) is a projection ($k$) which affords a socket for a set screw ($l$), rotated by a crank ($m$), which screw impinges upon the end of a bolt ($n$) which traverses in a socket ($o$); this bolt has at its other end a dog ($p$). This bolt ($n$) and dog ($p$) which vibrate together, have a lateral adjustability between the end of the set screw and a stationary block ($q$) which is attached to the transom. When the log is first placed in position on the carriages the dog ($p$) is driven home into it; after the cut, the log carrying the dog ($p$) along with it is shifted laterally until it is brought up by the contact of the dog ($p$) with the block ($q$); thus the space between the end of the set screw and the bolt then the dog is in contact with the block ($q$) is the determined width of the board less the kerf. The dog is thrown back and placed in its former position ready for determining the next cut. The wedge ($s$) between the rear carriage ($t$) and the under side of the block ($q$) which is stationary and attached to the transom ($e'$) holds the carriage firmly in the intervals of cutting. The dogs ($r$, $r$,) hold the log to the carriage.

Having thus fully clearly and exactly described the nature and operation of my invention what I claim therein as new and desire to secure by Letters Patent is—

1. The vibrating dog ($i$) having the distance of its head or tongue ($i'$) with respect to the saw, adjustable laterally by a set-screw ($g$) substantially as represented— so that by placing the tongue of the head in each successive kerf and bringing the face of the log in contact therewith, the thickness of each consecutive board is exactly counterpart with the first.

2. I claim, for analogous purposes at the rear end of the log which is destitute of a kerf, the vibrating dog ($p$) whose distance in respect to the stationary block ($q$) is adjustable by means of a set screw ($l$), the range between the head of the dog and the block affording an easy and determinate means of giving exactly the same thickness to the boards at the rear end of the log.

In testimony whereof, I have hereunto set my hand before two subscribing witnesses.

JOHN W. ROBBINS.

Witnesses:
 GEO. H. KNIGHT,
 E. H. PUGH.